(12) United States Patent
Cusenza et al.

(10) Patent No.: US 6,357,345 B1
(45) Date of Patent: Mar. 19, 2002

(54) MULTI-RESERVOIR AUTOMATIC DISPENSER SYSTEM

(75) Inventors: Anthony M. Cusenza; Luca Mainieri, both of Thousand Oaks; Clark Foster, Laguna Niguel, all of CA (US)

(73) Assignee: Romar LLC, Thousand Oaks, CA (US)

( * ) Notice: Subject to any disclaimer, the term of this patent is extended or adjusted under 35 U.S.C. 154(b) by 0 days.

(21) Appl. No.: 09/785,078

(22) Filed: Feb. 16, 2001

(51) Int. Cl.[7] .......................... A47J 31/42; A47J 42/16; A47J 42/50; B02C 19/00
(52) U.S. Cl. .................. 099/357; 099/286; 099/287; 099/289 R; 099/290; 222/132; 222/145.1
(58) Field of Search .................. 099/357, 509–511, 099/284–290, 295, 299–316; 241/34, 36, 37.5, 100, 199.12, 259.1, 261.2, 261.3; 222/132, 129.1, 145.1, 142.3, 144

(56) References Cited

U.S. PATENT DOCUMENTS

| | | | | |
|---|---|---|---|---|
| 3,827,640 A | * | 8/1974 | Marrie | 241/100 |
| 4,786,001 A | * | 11/1988 | Ephraim et al. | 241/101.8 |
| 4,967,649 A | * | 11/1990 | Ephraim et al. | 99/286 |
| 4,971,259 A | * | 11/1990 | Nidiffer | 241/34 |
| 5,058,814 A | * | 10/1991 | Ephraim et al. | 99/286 X |
| 5,123,572 A | * | 6/1992 | Ford | 241/100 X |
| 5,134,925 A | * | 8/1992 | Bunn et al. | 99/289 R |
| 5,230,278 A | * | 7/1993 | Bunn et al. | 99/307 X |
| 5,255,593 A | * | 10/1993 | Bunn et al. | 99/305 X |
| 5,303,639 A | * | 4/1994 | Bunn et al. | 99/300 X |
| 5,309,819 A | * | 5/1994 | Ford | 99/289 R |
| 5,958,769 A | * | 7/1999 | Capriglione | 222/132 |
| 6,131,772 A | * | 10/2000 | Robins et al. | 222/132 |

\* cited by examiner

Primary Examiner—Timothy F. Simone
(74) Attorney, Agent, or Firm—Pillsbury Winthrop LLP

(57) ABSTRACT

An improved apparatus for dispensing predetermined quantities of dry products simply, reliably, accurately and with an appropriate amount of care so that the product being dispensed is not unduly damaged. The present invention includes a plurality of hoppers, and so is capable of dispensing more than one type of product without forcing the user to go through a reloading step.

22 Claims, 4 Drawing Sheets

MULTI-RESERVOIR AUTOMATIC DISPENSER SYSTEM

BACKGROUND OF THE INVENTION

1. Field of the Invention

This invention relates in general to a system for dispensing dry product, and in particular, to a system for dispensing product in a manner that limits breakage or damage of the product.

2. Discussion of the Related Art

It is known in the art to utilize dispensers such as hoppers to dispense dry products, including particulate materials such as gravel and sand, and food products such as beans, peas, pastas and coffee. Such dispensers are very useful, since they allow for storage of and ready access to the material. These dispensers also allow for more versatility. If two such dispensers are appropriately associated with one apparatus, the user has the option of utilizing two different materials with the apparatus.

For example U.S. Pat. No. 5,671,657, to Ford, et al. (the "'657 patent"), discloses the use of multiple hoppers associated with a coffee grinder. In the invention of the '657 patent, each hopper may be used to store a different kind of bean. In this manner, the same grinder may be used to grind caffeinated and decaffinated coffee. This allows the user of the grinder to utilize it in a more versatile and efficient manner. Further, the use of multiple hoppers is cost-efficient. Like other dried food products, coffee tends to be relatively easy to spill during the handling process. It is preferable to use a dispenser, since the coffee only has to be handled during the loading of the dispenser. This leads to less spillage and more efficiency.

The hoppers in the art generally take the form of sloped or vertical containers with an opening at the bottom, through which the stored particles may be dispensed. While this configuration is appropriate for the dispensing of food, it is not ideal. Since the opening of the hopper is at the bottom of the container, the particles in the container have a downward force caused by gravity. There is no way known in the art to control the downward push of the particles. As such, the opening and closing of the bottom of the hopper is not "clean." That is, particles tend to become wedged in the moving part(s) at the bottom of the hopper. Alternatively, the moving part(s) may damage the particles if they are in the way when the opening is closing.

The present invention addresses these and other shortcomings through a method of dispensing material from a plurality of reservoirs in a manner that does not damage the particles. The features and advantages of the present invention will be explored more thoroughly through the following description and drawings. It should be understood, however, that the detailed description and specific examples, while indicating particular embodiments of the invention, are given by way of illustration only, and various modifications may naturally be performed without deviating from the spirit of the present invention.

DETAILED DESCRIPTION

The present invention relates to an improved apparatus for dispensing predetermined quantities of dried food products simply, reliably, accurately and with an appropriate amount of care so that the food 15 being dispensed is not unduly damaged. The present invention includes a plurality of hoppers, and so is capable of dispensing more than one type of foodstuff without forcing the user to go through a reloading step.

In the preferred embodiment of the present invention, the apparatus is utilized to dispense strand-type food, such as spaghetti or linguini. However, it should be understood that the multi-reservoir dispensing system of the present invention may be utilized to dispense many types of dry food including, but not limited to, short pasta, grains, cereals, beans and noodles.

The multi-reservoir automatic dispenser system 1 according to one embodiment of the present invention is designed with two food hoppers arranged about a central tilting chute 60 and its associated mechanism in a palindromic manner. That is, two similar hoppers are arranged about the central tilting chute 60 and its associated mechanism so that one may be found on one side of the mechanism, and the second may be found on the other side of the mechanism. For ease of explanation only one of the food hoppers, which will be referred to as the multi-reservoir automatic dispenser system 1 of the present invention, will be described herein. It should be understood that the second hopper operates in the same manner, with the same elements as the first hopper.

Figure 1:
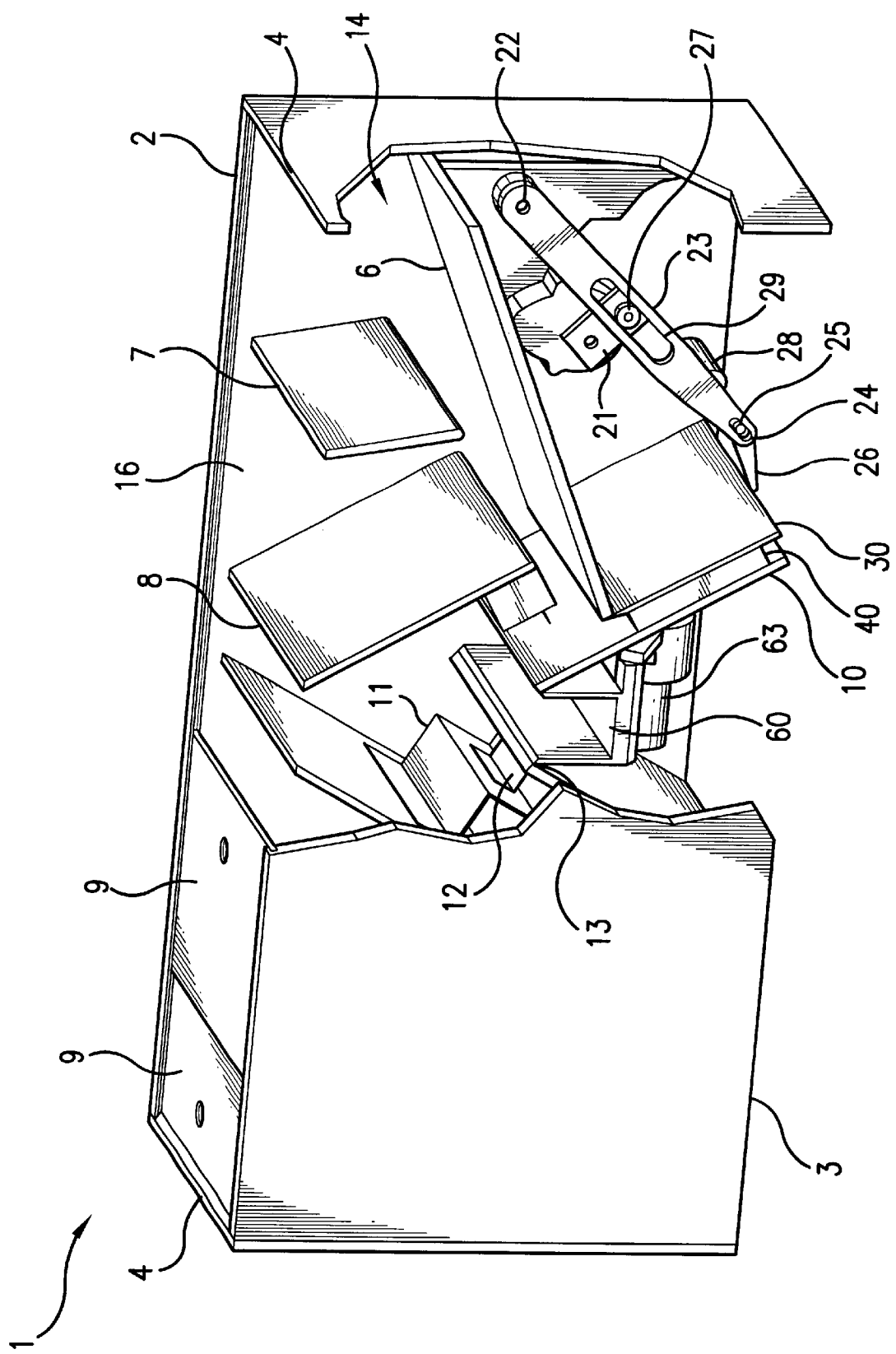
FIG. 1 illustrates an assembly of a precision hopper, with front, end, and top walls partially removed, according to one embodiment of the present invention.

As shown in FIG. 1, the multi-reservoir automatic dispenser system 1 according to one embodiment of the present invention is constituted by three angled panels: a sloped panel 6, the guide panel 7, and the central panel 8. The guide panel 7 is shown for ease of explanation in the figures. It should be understood that one embodiment of the present invention does not include the guide panel 7. These three panels may act in concert to direct the food 15 towards the location where they can be transferred to the central tilting chute 60. The food holding area described generally by the sloped panel 6, the guide panel 7, the central panel 8, end 4, back 2 and front 3 will be referred to as the food reservoir 16 (See FIG. 2).

When food is placed in the present invention, it flows down the sloped panel 6, and underneath the central panel 8 until it comes to rest against the spill off panel 10 and the flexible leveling tab 12, which serves to level the surface of the food and ensure that the appropriate amount is distributed. As more and more food is added to the invention, the food 15 will stack up against the guide panel 7, the sloped panel 6, the central panel 8 and the end 4 of the apparatus. Guide panel 7 operates primarily to maintain the food 15 in proper alignment with the system.

FIG. 2 illustrates an operational sequence that is capable of being performed by the apparatus according to one embodiment of the present invention. In FIG. 2(*a*), the food 15 may clearly be seen as resting against, among other things, spill off panel 10, sloped panel 6, guide panel 7, and central panel 8. The dispensing sequence that is depicted in FIGS. 2(*a*)–2(*c*) shows the transfer of one allotment of food from the food reservoir 16 to the central tilting chute 60. Generally, the dispensing sequence occurs when the blade actuating motor 20 drives the arm 23 around the fixed pivot 22 in an oscillating stroke. When not engaging in this operational sequence, the blade 30 is positioned flush with or just below the upper surface of the sloped panel 6.

Figure 2A:
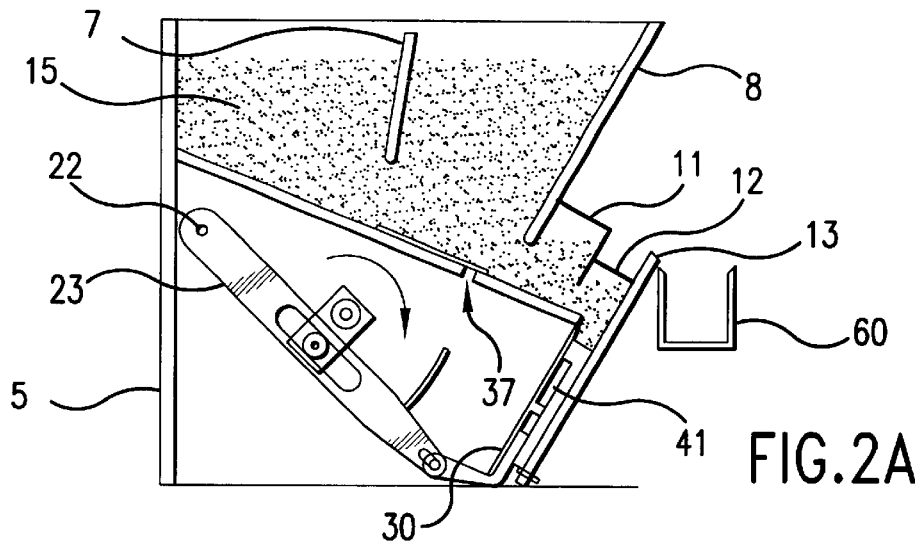
FIG. 2 illustrates an operational sequence that is capable of being preformed by the apparatus according to one embodiment of the present invention.

A general side view of a portion of the present invention as it appears just prior to the dispensing step may be seen in FIG. 2(a). The food 15 is resting, in part, against the beveled edge 13 of the spill-off panel 10. There is an arm 23 and a fixed arm pivot 22 about which the arm 23 may pivot. There is a blade 30 that, when moved by the arm 23, serves to partition the portion of the food 15 that will be dispensed from the bulk of the food. There is a shim 11 and a flexible leveling tab 12.

Figure 2B:
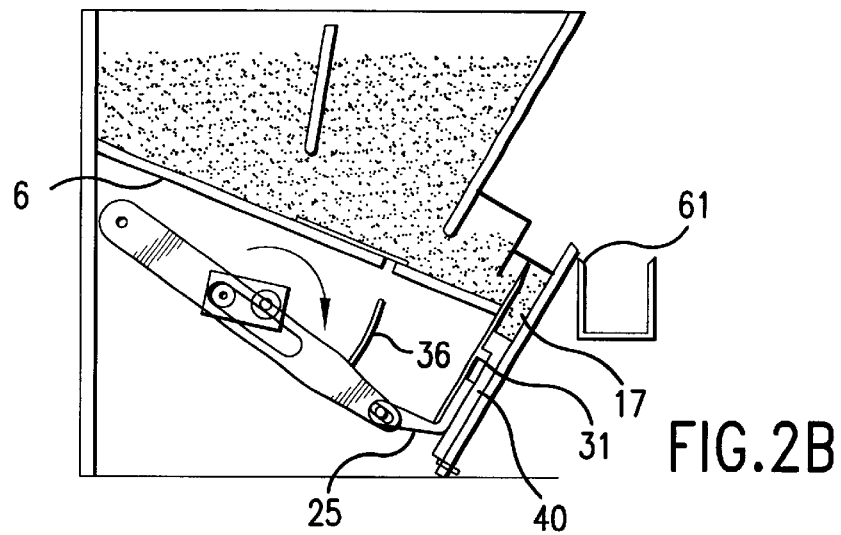

As may be seen in FIG. 2(b), when the arm 23 begins to rotate, blade 30 lifts up, and partitions a portion of the food 15. This portion of food 15, which is the amount to be dispensed, is momentarily contained in this configuration by the front 2 of the apparatus, the back 3 of the apparatus, the blade 30 and spill-off panel 10.

Figure 3:
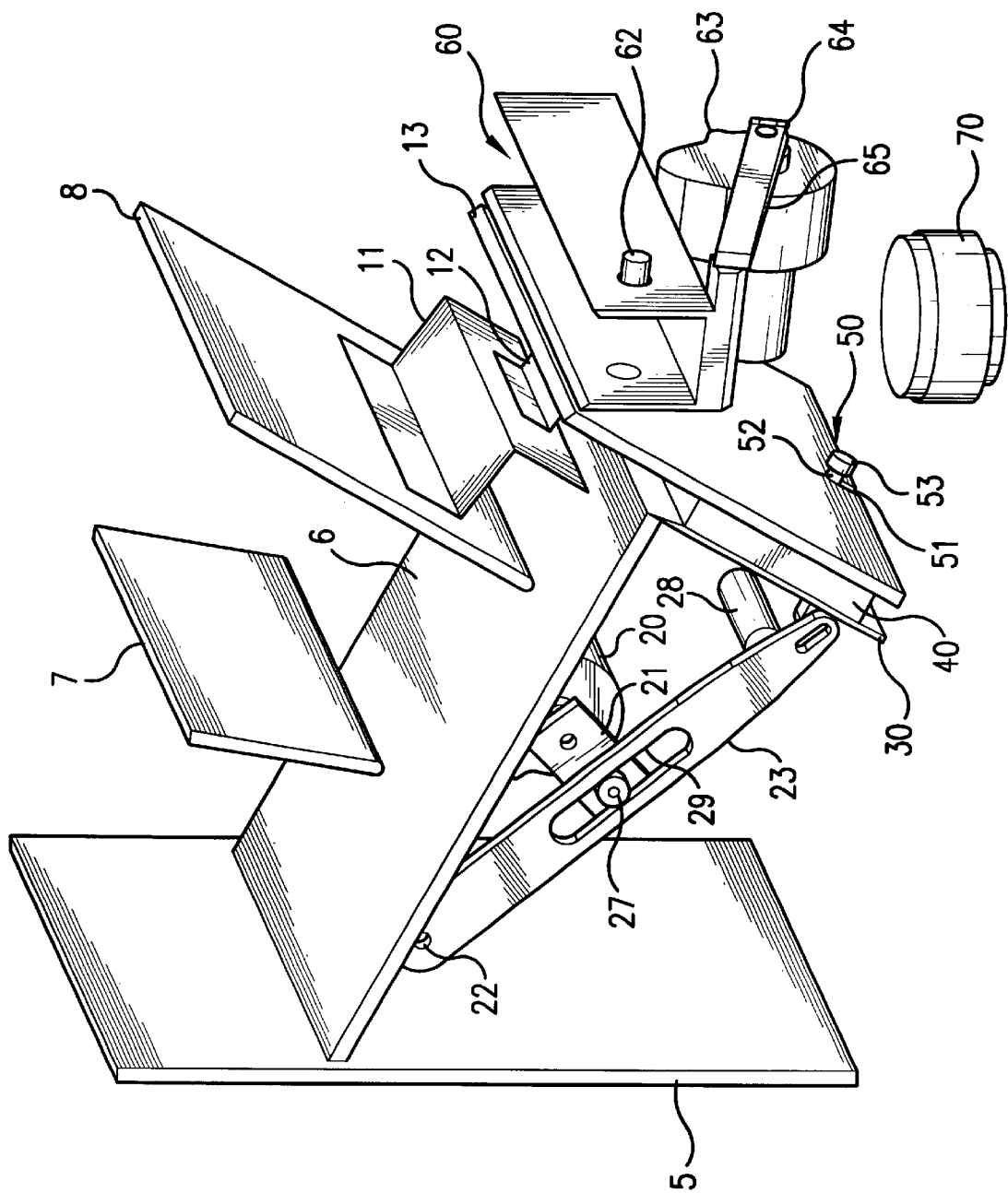
FIG. 3 illustrates a view of the mechanism of the precision hopper according to an embodiment of the present invention.
Figure 4:
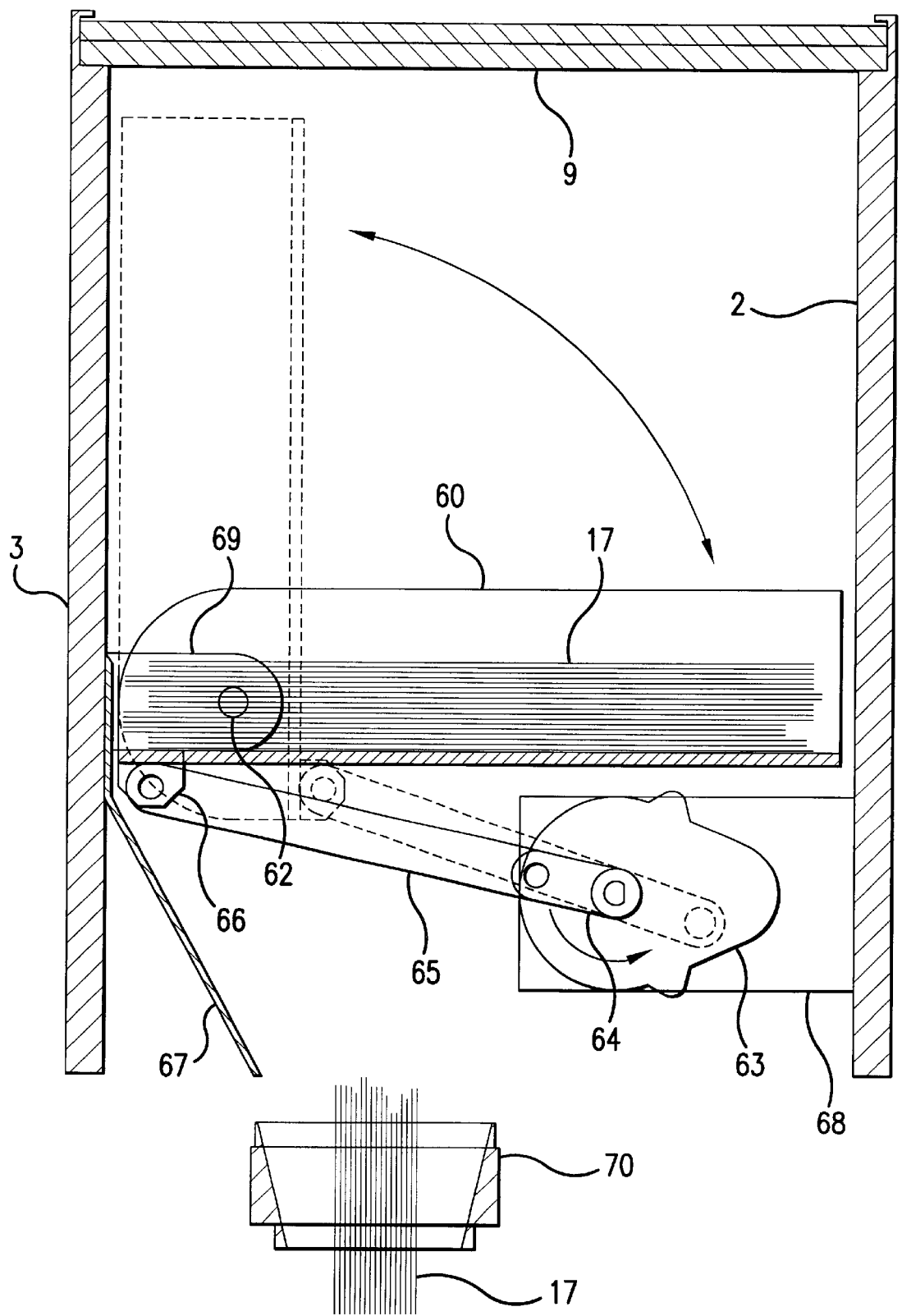
FIG. 4 illustrates an operational sequence that is capable of being performed by the apparatus according to one embodiment of the present invention.

The mechanism of an embodiment of the present invention that allows for this rotation may be clearly seen in FIGS. 1 and 3. The motion of blade 30 may be controlled, in part, by the blade bracket 26, which is secured to the blade by pin 25 that slides in the pin slot 24 of the arm 23. Arm 23 is also rotatably attached to fixed pivot 22. During one dispensing cycle, arm 23 may swing around the pivot 22 and be driven through an osculating stroke by blade actuating motor 20. The blade actuating motor is equipped with a crank 21 and crank roller 27 that engages the arm 23 through a roller slot 29. When the blade actuator motor 20 receives instructions to cycle through one revolution, the blade 30 travels from its standby position at the bottom of its stroke, to its raised position, and then back to its standby position. In one embodiment of the present invention, this cycle takes from 1 to 3 seconds.

In its standby position, the uppermost edge of the blade 30 is positioned flush with or below the upper surface of the sloped panel 6. In one embodiment of the present invention, the blade uppermost edge of the blade 30 is designed to be a sharpened upper edge 32 that will allow blade 30 to easily go through the food 15 with minimal disturbance or breakage. When the blade 30 is raised by the movement of the arm 23, as described above, it first passes through the food 15, and then contacts the flexible leveling tab 12. This movement of the blade 30 divides the food 15 so that it is located in two different regions. The first region is the reservoir 16, and the second region is the measured quantity 17 that will be dispensed. The measured region, which is defined by the blade 30, the flexible leveling tab 12, the spill off panel 10, the bucket 40, the front 3 of the apparatus and the back 2 of the apparatus may clearly be seen in FIG. 2(b).

Figure 2C:
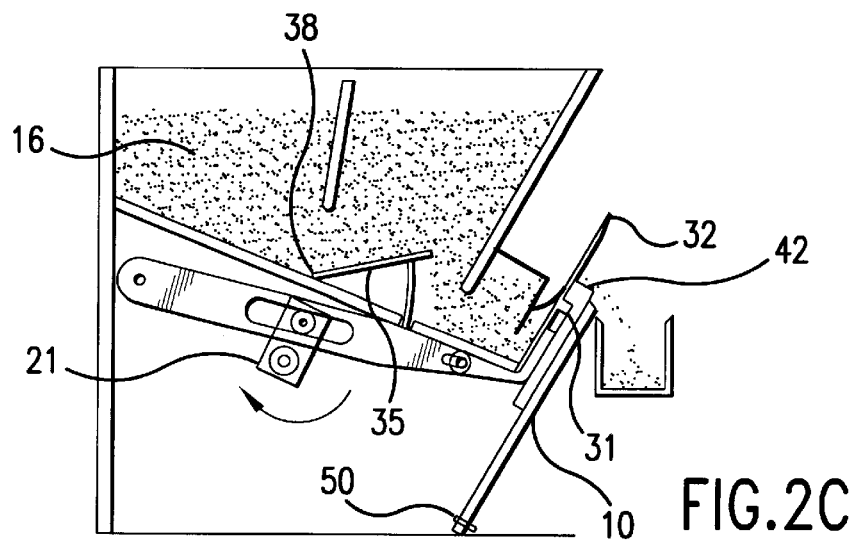

As shown in FIG. 2(c), the blade pin 31 engages the bucket 40, and the blade 30 and bucket 40 combination raise to the upper limit of the blade stroke. During each stroke, blade pin 31 travels in bucket slot 41, which has a closed upper end The present invention is designed such that when blade pin 31 travels up bucket slot 41, it engages the edge of the bucket 40 that closes the upper end of the bucket slot 41 at approximately the same time that the blade 30 contacts the flexible leveling tab 12. As the blade 30 continues through the upward stroke that is controlled by the arm 23, the blade pin 31 exerts pressure on the edge of the bucket 40 that closes the bucket slot 41, and lifts the bucket 40 and the food 17 contained therein. As the blade 30 rises above its contact point with the flexible leveling tab 12, the flexible leveling tab 12 bends and allow the blade 30 to pass. The measured quantity of food slides upward along the spill-off panel 10. As the food reaches the beveled edge 13 of the spill-off panel 10, it is free to fall into the tilting chute. The blade 30 and bucket 40 combination continue to the top of their stroke. In one embodiment of the present invention, the top of the stroke is defined so that the upper surface 42 of the bucket 40 is just above the beveled edge 13 of the spill-off panel 10, in order to release all of the food 17 contained in the measured quantity. The beveled edge 13 of the spill-off panel 10 acts to guide the falling food, adding a horizontal component to the falling food's velocity. This horizontal velocity component assures that the food will travel across the gap between the beveled edge 13 and the wall 61 of the tilting chute 60. This gap is present in one embodiment of the present invention to provide clearance for the tilting chute 60 as it rotates from horizontal to vertical during the tilting operation that occurs later in the dispensing sequence.

This use of the blade 30 and bucket 40 system provides a remarkable benefit over those devices that are known in the art, since it does not have moving parts that create the shearing motion. Such shearing motion may lead to broken or damaged food, and consequential jamming. The jamming may be caused by whole food that has become lodged in moving parts, or by the smaller, broken, portions that become similarly lodged. The present invention, in contrast, dispenses a measured quantity 17 through the use of the blade 30 and bucket 40 system. This system gently contains a measured quantity 17 of food 15, then raising the bucket 40 (which is the bottom of the area containing the measured quantity 17) and, effectively, all but one wall containing the measured quantity 17. This allows the measured quantity 17 to gently spill out, without damage, into tilting chute 60.

It should be noted that, in one embodiment of the present invention the bucket 40 remains at the bottom of its stroke, held in place by gravity and the weight of the food 15 that it supports until the bucket 40 is engaged by the blade pin 31.

As noted above, the movement of the arm 23 causes the blade 30 and the bucket 40 portion to lift up through the food, thereby isolating a measured quantity of food 17. This measured quantity 17 may be selected or altered by use of the dose adjuster 50. The dose adjuster 50 is generally composed of a dose bolt 52 that may slide into the dose slot 51 and be secured by tightening the dose nut 53. If the dose bolt 52 is secured towards the upper limit of the dose slot 51, the downward movement of the bucket 40 will be limited, thereby limiting the amount of food that may flow into the bucket 40, and hence the dispensed amount of food. The inverse applies if the dose bolt 52 is secured towards the lower limit of the dose slot 51; more food may then enter the bucket 40, and more food will be dispensed. The dose adjuster 50 has been described as using a dose bolt 52 and a dose nut 53. It should be understood by one of ordinary skill in the art that any known detent assembly would be appropriate.

In one embodiment of the present invention, there are markings beside the dose slot 51 indicating to the user the quantity of dried food that will be dispensed according to the position of the dose bolt 52. Alternatively, these markings may indicate the quantity of cooked food that may be produced from the dispensed amount.

In another embodiment of the present invention, the apparatus of the present invention may be equipped with a means to agitate the food 15 stored in the food reservoir 16. The presence of such an agitator may serve to improve the performance of the system. The agitation acts to keep the food 15 from clumping, or otherwise stacking in a manner that prevents the free-flow of food 15 down the sloped panel 6. This assists the food's 15 uniform arrival at the area where it is dispensed into the tilting chute 60. In one embodiment of the present invention, such agitation comes from light vibrations that are applied to the food reservoir 16. Alternatively, the guide panel 7 may be designed to move or vibrate by any means as is known in the art.

In one embodiment of the present invention, as shown in FIGS. 2(a)–(c), agitation may be achieved by use of an agitator plate 35 that is attached with a hinge 38 towards the center of the sloped panel 6. This agitator plate 35 may be designed to be activated by the movement of arm 23. A pin 36 may be attached to the arm 23 such that the pin 36 extends through an agitator hole 37 and rotates the agitator plate 35 every time that the arm 23 cycles through its stroke. The agitator plate 35 may be lowered as the arm 23 lowers and the food in the reservoir presses down on the agitator plate 35.

Once the blade 30 and bucket 40 have acted in concert as described above to deliver a measured amount 17 of food 15 to the tilting chute 60, the measured amount 17 of food 15 is ready to be dispensed. This is achieved by the pivotal rotation of the tilting chute 60 from horizontal to vertical about pivot 62. This rotation may be achieved by means of a tilter actuator motor 63, which may rotate the tilter through crank 64. As the crank 64 rotates, it drives the tilter link 65 and the tilting chute boss 66 through one cycle. As the tilting chute 60 approaches vertical, the measured amount 17 of food 15 slides downward. This measured amount 17 may be received by a funnel 70, or any other appropriate means as are known in the art. The food may be directed to the funnel 70 or other appropriate means by use of a guide 67. The pivot 62, guide 67 and tilter actuator motor 63 may be attached to the apparatus by means of brackets, such as bracket 68 and bracket 69.

While a tilting chute has been described in accordance with one embodiment of the present invention, it should be understood by one skilled in the art that such a chute may not be required for certain application of the present invention. For example, a funnel or other chute may be supplied that delivers the food directly, either by conveyor or under the force of gravity, to its intended destination.

The operations of the present invention, as described above, may be controlled from a control panel using sensors, switches and motor controllers as are known in the art. The operations may also be monitored and controlled remotely, so that it is possible to monitor the operations of the invention from a remote location. Such monitoring could serve, for example, to ascertain when it is necessary to add more food 15, or whether the appropriate measures amounts 17 have been dispensed.

It will be apparent to a person of ordinary skill in the art that embodiments of the present invention are not limited in their design or application to specific embodiments disclosed herein. Thus, the present invention is intended to encompass all of the embodiments disclosed and suggested herein as defined by the claims appended hereto and any equivalents thereof.

What is claimed is:

1. An apparatus for easy dispensing predetermined allotments of product, the apparatus comprising:
    a first side panel;
    a second side panel;
    a first and a second product management system, wherein each system comprises:
        an end panel, wherein the end panel connects an end of the first side panel with an end of the second side panel;
        a sloped floor panel, wherein the sloped floor panel lies between the first and second side panels and abuts the end panel, and further wherein the sloped floor panel slopes in a downwards direction away from the end panel;
        a central panel having a top, a bottom, a first edge, a second edge, a first side and a second side, wherein the central panel slopes in a downwards direction towards the sloped floor panel, and further wherein the central panel lies between the first and second side panels;
        a bucket having a sloped bottom, wherein the bucket is located adjacent to an edge of the sloped floor panel that is farthest from the end panel, wherein the bucket may be moved in an upwards and downwards angled motion;
        a spill-off panel located adjacent to the bucket, wherein the upwards motion of the bucket brings the bottom of the bucket to a location just above the spill-off panel;
        a blade located between the bucket and the sloped floor panel, wherein the blade may be moved in an upwards and downwards angled motion, and further wherein the upwards movement of the blade serves to partition a metered portion of the product;
        a mechanism, wherein the movement of the mechanism serves to move the blade and the bucket in an upwards angled motion;
        an actuator motor which drives the movement of the mechanism;
        a detent assembly that may be placed so that the bucket will encounter the detent assembly during its downward movement, wherein the encountering of the detent assembly will halt the downward motion of the bucket, and further wherein the halting of the downward motion of the bucket will select the metered portion of the product;
        a tilting chute located adjacent to the spill-off panel, wherein the raising of the bucket allows the partitioned material to slide out of the bucket and into tilting chute; and
        a tilter actuator motor which rotates the tilting chute from horizontal to vertical upon demand.

2. The apparatus as in claim 1, wherein the blade has a pointed edge to facilitate the partitioning of the metered portion of the product.

3. The apparatus as in claim 1, wherein the arm engages the blade and a tab on the bucket to raise the blade and the bucket.

4. The apparatus as in claim 1, wherein the actuator motor includes a crank and crank roller that engages the arm.

5. The apparatus as in claim 1, wherein the detent assembly is a nut and bolt combination.

6. The apparatus as in claim 5, wherein the nut and bolt combination is tightened about a slot in the spill-off panel.

7. The apparatus as in claim 1, further including a guide panel located between the first and second side panels, and further located between the central panel and the first end panel.

8. The apparatus as in claim 6, wherein the guide panel is tilted relative to the end panel in the same direction as the central panel.

9. The apparatus as in claim 1, further including a leveling tab to assist in the metering of the product.

10. The apparatus as in claim 8, wherein the leveling tab is be moved by the upwards movement of the blade.

11. The apparatus as in claim 1, further including markings indicating where to place the nut and bolt combination in order to dispense certain predetermined allotments of food.

12. The apparatus as in claim 1, further including an agitator plate rotatably attached to the sloped floor panel.

13. The apparatus as in claim 11, wherein one end of the agitator plate is raised by the rotation of the arm.

14. An apparatus for easy dispensing predetermined allotments of product, the apparatus comprising:
- a first side panel;
- a second side panel;
- a first and a second product management system, wherein each system comprises:
  - an end panel, wherein the end panel connects an end of the first side panel with an end of the second side panel;
  - a sloped floor panel, wherein the sloped floor panel lies between the first and second side panels and abuts the end panel, and further wherein the sloped floor panel slopes in a downwards direction away from the end panel;
  - a central panel having a top, a bottom, a first edge, a second edge, a first side and a second side, wherein the central panel slopes in a downwards direction towards the sloped floor panel, and further wherein the central panel lies between the first and second side panels;
  - a bucket having a sloped bottom, wherein the bucket is located adjacent to an edge of the sloped floor panel that is farthest from the end panel, wherein the bucket may be moved in an upwards and downwards angled motion;
  - a spill-off panel having a slot extending vertically through a portion of the panel located adjacent to the bucket, wherein the upwards motion of the bucket brings the bottom of the bucket to a location just above the spill-off panel;
  - a blade located between the bucket and the sloped floor panel, wherein the blade may be moved in an upwards and downwards angled motion, and further wherein the upwards movement of the blade serves to partition a metered portion of the product;
  - an arm that rotates about a fixed point in an oscillating stroke, and wherein the rotation of the arm serves to move the blade and the bucket in an upwards angled motion;
  - a leveling tab attached to the central panel and extending towards the spill-off panel, wherein at least a portion of the leveling tab is flexible, and further wherein the upward motion of the blade moves the flexible end of the leveling tab;
  - an actuator motor which drives the rotation of the arm; and
  - a nut and bolt combination that may be releasably attached to the slot in the spill-off panel so that the bucket will encounter the nut and bolt combination during its downward movement, wherein the encountering of the nut and bolt combination will halt the downward motion of the bucket, and further wherein the halting of the downward motion of the bucket will select the metered portion of the product;
  - a tilting chute located adjacent to the spill-off panel, wherein the raising of the bucket allows the partitioned material to slide out of the bucket and into tilting chute; and
  - a tilter actuator motor which rotates the tilting chute from horizontal to vertical upon demand.

15. The apparatus as in claim 14, wherein the blade has a pointed edge to facilitate the partitioning of the metered portion of the product.

16. The apparatus as in claim 14, wherein the arm engages the blade and a tab on the bucket to raise the blade and the bucket.

17. The apparatus as in claim 14, wherein the actuator motor includes a crank and crank roller that engages the arm.

18. The apparatus as in claim 14, further including a guide panel located between the first and second side panels, and further located between the central panel and the first end panel.

19. The apparatus as in claim 18, wherein the guide panel is tilted relative to the end panel in the same direction as the central panel.

20. The apparatus as in claim 14, further including markings indicating where to place the nut and bolt combination in order to dispense certain predetermined allotments of food.

21. The apparatus as in claim 14, further including an agitator plate rotatably attached to the sloped floor panel.

22. The apparatus as in claim 21, wherein one end of the agitator plate is raised by the rotation of the arm.

* * * * *